United States Patent
Kim et al.

(10) Patent No.: US 8,331,433 B2
(45) Date of Patent: Dec. 11, 2012

(54) VIDEO ENCODING APPARATUS AND METHOD AND VIDEO DECODING APPARATUS AND METHOD

(75) Inventors: Dae-hee Kim, Suwon-si (KR); Hyun-mun Kim, Seongnam-si (KR); Dae-sung Cho, Seoul (KR); Woong-il Choi, Yongin-si (KR); Jae-woo Jung, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1495 days.

(21) Appl. No.: 11/896,443

(22) Filed: Aug. 31, 2007

(65) Prior Publication Data

US 2008/0056352 A1     Mar. 6, 2008

(30) Foreign Application Priority Data

Aug. 31, 2006 (KR) .......................... 10-2006-0083657
Nov. 17, 2006 (KR) .......................... 10-2006-0113614

(51) Int. Cl.
*H04B 1/66* (2006.01)

(52) U.S. Cl. ....................................... 375/240
(58) Field of Classification Search ................... 375/240
See application file for complete search history.

(56) References Cited

U.S. PATENT DOCUMENTS

| | | | |
|---|---|---|---|
| 5,412,428 A | 5/1995 | Tahara | |
| 6,674,477 B1 | 1/2004 | Yamaguchi et al. | |
| 7,636,392 B2 * | 12/2009 | Moni et al. | 375/240.03 |
| 7,949,044 B2 * | 5/2011 | Winger et al. | 375/240.03 |
| 2003/0163211 A1 * | 8/2003 | Van Der Meulen | 700/94 |
| 2005/0100091 A1 | 5/2005 | Hanamura et al. | |
| 2005/0259729 A1 | 11/2005 | Sun | |

FOREIGN PATENT DOCUMENTS

EP     1 223 759     7/2002

(Continued)

OTHER PUBLICATIONS

PCT International Search Report issued in corresponding International Patent Application No. PCT/KR2007/004208, mailed on Dec. 10, 2007.

(Continued)

*Primary Examiner* — Christopher Brown
(74) *Attorney, Agent, or Firm* — Staas & Halsey LLP

(57) ABSTRACT

A video encoding apparatus and method and a video decoding apparatus and method are provided. The video encoding apparatus includes a base layer encoding unit generating a base layer bitstream including a quantization level of video data and a base quantization parameter corresponding to a base bit-depth, an enhancement layer encoding unit generating an enhancement layer bitstream including a refined quantization parameter for refining the difference between an extended bit-depth and the base bit-depth, and a bitstream combining unit combining the base layer bitstream and the enhancement layer bitstream to generate the scalable bitstream. The video decoding apparatus includes a base layer decoding unit decoding a base layer bitstream including a quantization level of video data and a base quantization parameter corresponding to a base bit-depth in a received bitstream to obtain a base restoration image, an enhancement layer decoding unit decoding an enhancement layer bitstream including a refined quantization parameter for refining the difference between an extended bit-depth and the base bit-depth in the received bitstream, and a bit-depth restoration unit obtaining an extended restoration image corresponding to an extended bit-depth by using the decoded quantization level, the decoded base quantization parameter, and the decoded refined quantization parameter.

13 Claims, 8 Drawing Sheets

FOREIGN PATENT DOCUMENTS

| KR | 10-2005-0045923 | 5/2005 |
|---|---|---|
| WO | 99/56472 | 11/1999 |

OTHER PUBLICATIONS

European Search Report dated Nov. 18, 2011 issued in corresponding European Patent Application No. 07793781.1.

A. Tanju Erdem et al., "Compression of 10-bit video using the tools of MPEG-2", Signal Processing: Image Communications, vol. 7, 1995, pp. 27-56.

Barry G. Haskell et al., "Digital Video: An Introduction to MPEG-2", Digital Multimedia Standard Series, 1997, pp. 267-268.

Ming-Ting Sun et al., "Compressed Video Over Networks", Signal Processing and Communications Series, 2001, pp. 260-276.

Korean Office Action issued Jul. 25, 2012 in corresponding Korean Patent Application No. 10-2006-0083657.

Korean Office Action issued Jul. 25, 2012 in corresponding Korean Patent Application No. 10-2006-0113614.

* cited by examiner

| Start-CODE Suffix | BDU Type | |
|---|---|---|
| 0x00 | SMPTE Reserved | (451) |
| 0x01-0x09 | SMPTE Reserved | (452) |
| 0x0A | end-of-Sequence | (411) |
| 0x0B | Slice | (412) |
| 0x0C | Field | (413) |
| 0x0D | Frame | (414) |
| 0x0E | Entry-point Header | (415) |
| 0x0F | Sequence Header | (416) |
| 0x10-0x1A | SMPTE Reserved | (453) |
| 0x1B | Slice Level User Data | (417) |
| 0x1C | Field Level User Data | (418) |
| 0x1D | Frame Level User Data | (419) |
| 0x1E | Entry-point Level User Data | (420) |
| 0x1F | Sequence Level User Data | (421) |
| 0x20-40, 0x41-0x7F | SMPTE Reserved | (454) |
| 0x80-0xFF | Forbidden | (422) |

VIDEO ENCODING APPARATUS AND METHOD AND VIDEO DECODING APPARATUS AND METHOD

CROSS-REFERENCE TO RELATED PATENT APPLICATIONS

This application claims the benefit of Korean Patent Application Nos. 10-2006-0083657, filed on Aug. 31, 2006, and 10-2006-0113614, filed on Nov. 17, 2006 in the Korean Intellectual Property Office, the disclosure of which is incorporated herein in its entirety by reference.

BACKGROUND OF THE INVENTION

1. Field of the Invention

The present invention relates to a video encoding apparatus and method and a video decoding apparatus and method, and more particularly, to a video encoding apparatus and method and a video decoding apparatus and method in which a scalable bitstream supporting at least one coding parameter of at least two bit-depths and at least two video formats with forward compatibility is generated or decoded.

2. Description of the Related Art

In an ordinary video codec according to conventional technology, when the bit-depth of a basic encoder such as a VC-1 encoder, is changed from 8 bits to 10 bits, or when the video format of a basic encoder is simply extended from 4:2:0 to 4:2:2 or 4:4:4, it is impossible for a VC-1 decoder to read and reproduce a bitstream which is generated from improved encoders having the extended bit-depth or the extended video format. Recently, the necessity for development of a video codec which guarantees forward compatibility and then allows a VC-1 decoder and other improved decoders to restore a bitstream encoded with a variety of bit-depths or video formats as well as the fixed bit-depth or fixed video format, has been increasingly highlighted.

That is, since a new video codec which does not guarantee forward compatibility cannot support a terminal having only a conventional basic video codec, reuse of digital content in both terminals having specifications different from each other becomes impossible. In addition, it will take much time for the new video codec to settle into the market, because the new video codec needs to overcome the already established conventional video codec market.

SUMMARY OF THE INVENTION

The present invention provides a video encoding apparatus and method by which a scalable bitstream supporting at least one coding parameter of at least two bit-depths and at least two video formats with forward compatibility is generated.

The present invention also provides a video decoding method and apparatus for decoding a bitstream supporting at least one coding parameter of at least two bit-depths and at least two video formats with forward compatibility.

According to an aspect of the present invention, there is provided a video encoding apparatus for generating a scalable bitstream supporting at least one coding parameter of at least two bit-depths and at least two video formats with forward compatibility, the video encoding apparatus comprising: a base layer encoding unit generating a base layer bitstream including a quantization level of video data and a base quantization parameter corresponding to a base bit-depth; an enhancement layer encoding unit generating an enhancement layer bitstream including a refined quantization parameter for refining the difference between an extended bit-depth and the base bit-depth; and a bitstream combining unit combining the base layer bitstream and the enhancement layer bitstream to generate the scalable bitstream.

According to another aspect of the present invention, there is provided a video encoding apparatus for generating a scalable bitstream supporting at least two video formats with forward compatibility, the video encoding apparatus comprising: a base layer encoding unit generating a base layer bitstream including a luminance bitstream obtained by encoding a luminance block, and a first chrominance bitstream obtained by encoding a chrominance block of a base video format; an enhancement layer encoding unit generating an enhancement layer bitstream including a second chrominance bitstream which is obtained by encoding a chrominance residue image between a restored chrominance block of an extended video format and an original chrominance block; and a bitstream combining unit combining the base layer bitstream and the enhancement layer bitstream to generate the scalable bitstream.

According to another aspect of the present invention, there is provided a video encoding method of generating a scalable bitstream supporting at least one coding parameter of at least two bit-depths and at least two video formats with forward compatibility, wherein the scalable bitstream comprises: a base layer bitstream including a quantization level of video data and a base quantization parameter corresponding to a base bit-depth; and an enhancement layer bitstream including a refined quantization parameter for refining the difference between an extended bit-depth and the base bit-depth.

According to another aspect of the present invention, there is provided a video encoding method of generating a scalable bitstream supporting at least two video formats with forward compatibility, wherein the scalable bitstream comprises: a base layer bitstream including a luminance bitstream obtained by encoding a luminance block, and a first chrominance bitstream obtained by encoding a chrominance block of a base video format; and an enhancement layer bitstream including a second chrominance bitstream which is obtained by encoding a chrominance residue image between a restored chrominance block of an extended video format and an original chrominance block.

According to another aspect of the present invention, there is provided a video decoding apparatus including: a base layer decoding unit decoding a base layer bitstream including a quantization level of video data and a base quantization parameter corresponding to a base bit-depth in a received bitstream to obtain a base restoration image; an enhancement layer decoding unit decoding an enhancement layer bitstream including a refined quantization parameter for refining the difference between an extended bit-depth and the base bit-depth in the received bitstream; and a bit-depth restoration unit obtaining an extended restoration image corresponding to an extended bit-depth by using the decoded quantization level, the decoded base quantization parameter, and the decoded refined quantization parameter.

According to another aspect of the present invention, there is provided a video decoding apparatus including: determining whether or not an enhancement layer identifier is included, by interpreting a bitstream being received; if the bitstream does not include an enhancement layer identifier, generating a base restoration image, by decoding a base layer bitstream in the received bitstream according to base bit-depth; if the bitstream includes the enhancement layer identifier, decoding an enhancement layer bitstream in the received bitstream according to extended bit-depth; and if the bitstream includes the enhancement layer identifier, restoring the bit-depth of the enhancement layer bitstream by using decoded base layer information.

According to another aspect of the present invention, there is provided a video decoding method including: decoding a base layer bitstream including a quantization level of video data and a base quantization parameter corresponding to a base bit-depth in a received bitstream to obtain a base restoration image; decoding an enhancement layer bitstream including a refined quantization parameter for refining the difference between an extended bit-depth and the base bit-depth in the received bitstream; and obtaining an extended restoration image corresponding to an extended bit-depth by using the decoded quantization level, the decoded base quantization parameter, and the decoded refined quantization parameter.

According to another aspect of the present invention, there is provided a video decoding method including: A video decoding method comprising: decoding a base layer bitstream including a luminance bitstream obtained by encoding a luminance block, and a first chrominance bitstream obtained by encoding a chrominance block of a base video format in a received bitstream to obtain a base restoration image corresponding to the base video format; decoding an enhancement layer bitstream including a second chrominance bitstream which is obtained by encoding a chrominance residue image between a restored chrominance block of an extended video format and an original chrominance block in the received bitstream; and obtaining an extended restoration image corresponding to the extended video format by using the base restoration image and the decoded chrominance residue image.

According to still another aspect of the present invention, there is provided a computer readable recording medium having embodied thereon a computer program for executing the video encoding method and the video decoding method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
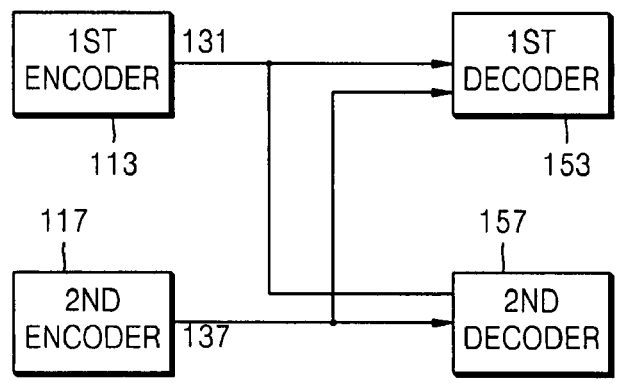
FIG. 1 is a diagram explaining concepts of a video encoding apparatus and video decoding apparatus according to an embodiment of the present invention.

FIG. 1 is a diagram explaining concepts of a video encoding apparatus and video decoding apparatus according to an embodiment of the present invention. As an encoder part, examples of a first encoder 113 performing the role of a basic encoder and a second encoder 117 performing the role of an improved encoder will be explained. As a decoder part, examples of a first decoder 153 performing the role of a basic decoder and corresponding to the first encoder 113, and a second decoder 157 performing the role of an improved decoder and corresponding to the second encoder 117 will be explained. In an embodiment of the present invention, the first encoder 113 generates a bitstream according to a base bit-depth and a first video format, and the second encoder 117 generates a scalable bitstream supporting both the base bit-depth and an extended bit-depth and complying with the first video format. In another embodiment of the present invention, the first encoder 113 generates a bitstream according to the base bit-depth and the first video format, and the second encoder 117 generates a scalable bitstream supporting both the first video format and a second video format and complying with the base bit-depth. In still another embodiment of the present invention, the first encoder 113 generates a bitstream according to the base bit-depth and the first video format, and the second encoder 117 generates a scalable bitstream supporting both the base bit-depth and the extended bit-depth, and both the first and second video formats, or a bitstream supporting both the base bit-depth and the extended bit-depth and both the first video format and a third video format.

For convenience of explanation, an example will be given, in which a base bit-depth is 8 bits, an extended bit-depth is 10 bits, a first video format is 4:2:0, a second video format is 4:2:2, and a third video format is 4:4:4. According to the example, a VC-1 encoder supporting 8 bits and a 4:2:0 video format may be employed as the first encoder 113.

Referring to FIG. 1, a bitstream 131 generated in the first encoder 113 can be decoded in the second decoder 157 as well as in the first decoder 153. A scalable bitstream 137 generated in the second encoder 117 can be decoded in the second decoder 157. In the first decoder 153, a base layer bitstream in the scalable bitstream 137 can be decoded in a state in which an enhancement layer bitstream included in the scalable bitstream 137 is ignored. The second encoder 117 which is capable of providing this forward compatibility corresponds to a video encoding apparatus of the present invention, while the second decoder 157 corresponds to a video decoding apparatus of the present invention.

Figure 2:
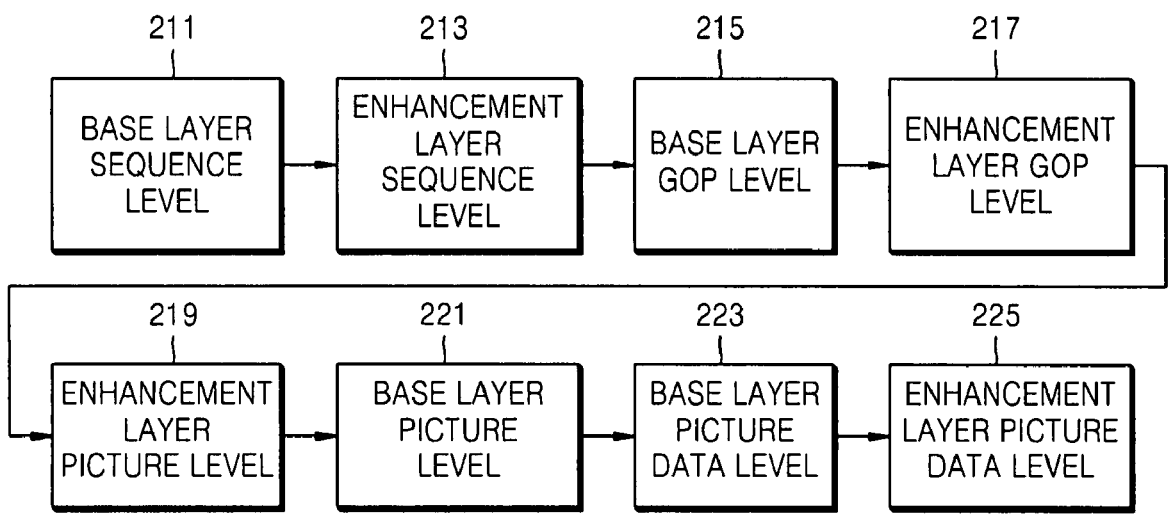
FIG. 2 is a diagram illustrating an example of syntax of a scalable bitstream which is obtained from a video encoding apparatus according to an embodiment of the present invention.

FIG. 2 is a diagram illustrating an example of syntax of a scalable bitstream which is obtained from a video encoding apparatus according to an embodiment of the present invention. The syntax is composed of a base layer bitstream and an enhancement layer bitstream.

More specifically, the scalable bitstream illustrated in FIG. 2 is composed of a base layer sequence level 211, an enhancement layer sequence level 213, a base layer group of pictures (GOP) level 215, an enhancement layer GOP level 217, an enhancement layer picture level 219, a base layer picture level 221, a base layer picture data level 223, and an enhancement layer picture data level 225. Although the enhancement layer picture level 219 is positioned in front of the base layer picture level 221 in this case, the enhancement layer picture level 219 may be positioned behind the base layer picture level 221. The base layer GOP level 215 and the enhancement layer GOP level 217 can be optionally included in the scalable bitstream.

Here, a sequence is formed with at least one or more encoded pictures or at least one or more GOPs. A GOP is formed with at least one or more encoded pictures, and in the case of a VC-1 codec, an entry-point may be used. Here, the first picture in each GOP can provide a random access function. Meanwhile, a picture is divided into macroblocks, and if the video format is 4:2:0, each macroblock is formed of 4 luminance blocks and 2 chrominance blocks.

FIGS. 3A through 3D are diagrams illustrating examples of information included in each level illustrated in FIG. 2 according to an embodiment of the present invention.

Figure 3A:
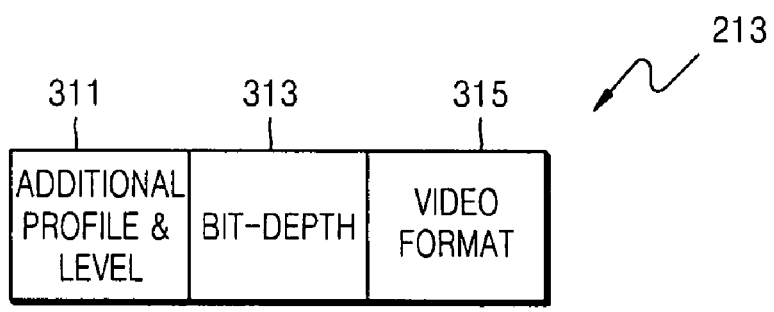
FIGS. 3A through 3D are diagrams illustrating examples of information included in each level illustrated in FIG. 2 according to an embodiment of the present invention.
Figure 3B:
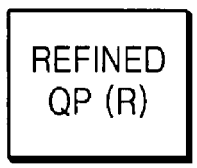

FIG. 3A illustrates information included in the enhancement layer sequence level 213, and includes an additional profile and level 311 which can be supported in an enhancement layer, and a bit-depth 313 which the enhancement layer can support. Here, if a video format 315 can be defined in the base layer sequence level 211, the video format 315 does not have to be included in the enhancement layer sequence level 213. FIG. 3B illustrates information included in the enhancement layer picture level 219, and includes a refined quantization parameter (QP) (R) for refining the difference between a base bit-depth and an extended bit-depth, in consideration of the extended bit-depth that cannot be expressed in the base layer.

Figure 3C:
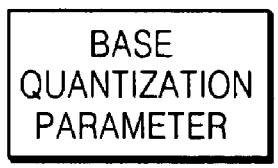
Figure 3D:
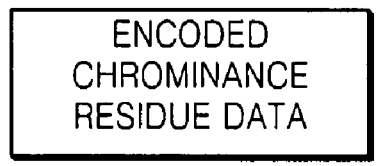

FIG. 3C illustrates information included in the base layer picture level 221, and includes a base quantization parameter of the first encoder 113. FIG. 3D illustrates information included in the enhancement layer picture data level 225, and indicates encoded chrominance residue data when the video formats of the first encoder 113 and the second encoder 117 are different from each other. Meanwhile, although not shown, when a bit-depth is extended in the present invention, an extended quantization level by an extended quantization parameter instead of a base quantization level by a base quantization parameter is included in the base layer picture data level 223, while the extended quantization level is not included in the enhancement layer picture data level 225. According to another embodiment of the present invention, a modified quantization level induced from the extended quantization parameter is included in the base layer picture data level 223.

Figures 4, 5:
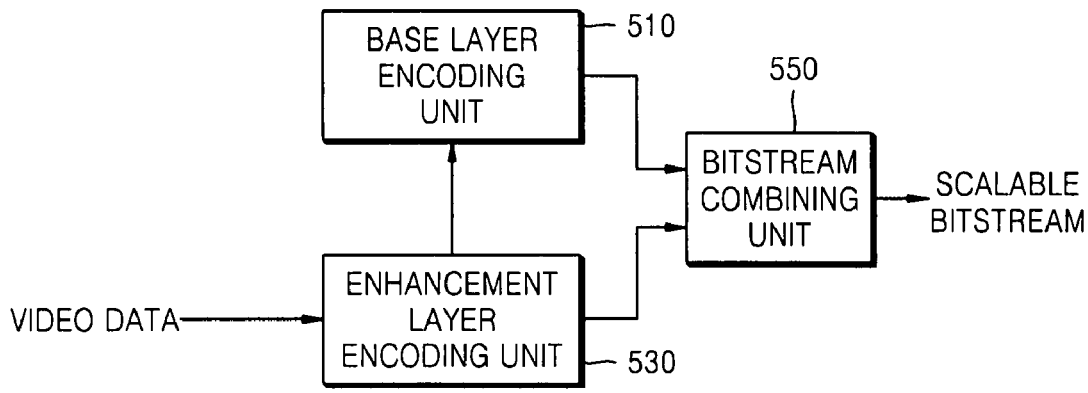
FIG. 4 is a diagram illustrating an example of a start code which is an interval for loading an enhancement layer identifier in a video encoding apparatus according to an embodiment of the present invention.
FIG. 5 is a block diagram illustrating a structure of a video encoding apparatus according to an embodiment of the present invention.

FIG. 4 is a diagram illustrating areas for loading information related to an enhancement layer, including an enhancement layer identifier, in a scalable bitstream obtained from a video encoding apparatus according to an embodiment of the present invention. When the first encoder 113 is a VC-1 encoder, a start code of a 4-byte unit may be used in an embodiment of the present invention. In the VC-1 encoder, a start code can be supported at an advanced profile or a profile higher than the advanced profile. Meanwhile, the start code may be included in the first area of the header of each level.

A process of loading information related to an enhancement layer in a start code of the VC-1 used as an embodiment of the present invention will now be explained with reference to FIG. 4. Among bitstream data unit (BDU) types defined in a suffix in a start code, reserved areas 451, 452, 453, and 454 reserved for future use are used for loading information related to the enhancement layer. Here, the BDU means a compression data unit that can be parsed independently of other information items in an identical layer level. For example, the BDU may be a sequence header, an entry point header, an encoded picture or a slice. Among the BDU types defined in the suffix of the start code, the remaining areas 411 through 421, excluding a forbidden area 422, are for loading information related to a base layer. Here, the start code is only an example, and other parts in the elements of a bitstream may also be used.

Meanwhile, an enhancement layer includes a sequence level, a GOP level, a frame level, a field level, and a slice level. According to an embodiment of the present invention, information of the enhancement layer may be included in one of the second reserved area 452 and the fourth reserved area 454. More specifically, a start code is included in a header for a sequence level of the enhancement layer as '0x09' in the second reserved area 452 or '0x40' in the fourth reserved area 454. A start code is included in a header for a GOP level of the enhancement layer as '0x08' in the second reserved area 452 or '0x3F' in the fourth reserved area 454. A start code is included in a header for a frame level of the enhancement layer as '0x07' in the second reserved area 452 or '0x3E' in the fourth reserved area 454. A start code is included in a header for a field level of the enhancement layer as '0x06' in the second reserved area 452 or '0x3D' in the fourth reserved area 454. A start code for enhancement chrominance data is included in a header for enhancement layer data as '0x06' in the second reserved area 452 or '0x3C' in the fourth reserved area 454.

This will now be explained in more detail.

Examples of Information items that can be included in the start code of the header for the enhancement layer sequence level which is defined as '0x09' in the second reserved area 452 include information on an additional profile and level that can be achieved by the enhancement layer in addition to a base layer, and information on a bit-depth. More specifically, in the sequence level of the base layer, a profile is defined by 2 bits, and '3' indicates an advanced profile and '0-2' indicates a reserved area. Meanwhile, a level is defined by 3 bits, '000' indicates AP@L0, '001' indicates AP@L1, '010' indicates AP@L2, '011' indicates AP@L3, '100' indicates AP@L4, and '101-111' indicates a reserved area. Information on a bit-depth that can be achieved by the enhancement layer can be expressed by a value from "N–8" (where N is an extended bit-depth). According to a base bit-depth of the first encoder 113 illustrated in FIG. 1 corresponding to the base layer, a value other than 8 can be used. Meanwhile, as information on the enhancement layer, information on an extended video format may be included. The video format information may be expressed by using a variable included in the sequence level of the base layer, for example, in the case of the VC-1 encoder, a 'COLORDIFF' variable. The video format information may also be included in '0x09' in the second reserved area 452. That is, when a variable of the base layer is used, the enhancement layer does not have to transmit the information of the extended video format separately. In the example of the 'COLORDIFF' variable, '1' is used for defining a 4:2:0 video format, and '2' and '3' are specified as reserved areas. Accordingly, the variable can be used for defining a 4:2:2 video format and a 4:4:4 video format. Meanwhile, as information on the enhancement layer, an additional hypothetical reference decoder (HRD) variable may be included. The HRD variable is a virtual video buffer variable which a decoder refers to for operating a buffer.

When a bit-depth or a video format does not change in units of GOPs, the start code of the header for the enhancement layer GOP level which is defined as '0x08' in the second reserved area 452 is not necessary, and is designated as a reserved area. When the bit-depth or video format is changed in units of GOPs, the start code is necessary.

The start code for the header of the picture level, i.e., a frame level and a field level, of the enhancement layer which is defined as '0x07' and '0x06' in the second reserved area 452, includes a refined QP (R) for indicating the remaining bit-depth of the enhancement layer that cannot be expressed by the base layer according to progressive or interlaced scanning. In an embodiment of the present invention, the start code includes a refined QP (R) for 'N−8' (where N is the bit-depth of the second encoder 117) when the bit-depth of the first encoder 113 is 8 bits. In this case, since the refined QP (R) is used in units of pictures, the refined QP (R) is included in the picture level. However, in other embodiments of the present invention, when a refined QP (R) is used in units of slices, the refined QP (R) is included in the slice level, when a refined QP (R) is used in units of macroblocks, the refined QP (R) is included in the macroblock level, and when a refined QP (R) is used in units of blocks, the refined QP (R) is included in the block level. In order to calculate a refined QP (R) for each macroblock or block, a process for calculating a refined QP (R) of a picture level which will be explained later can be applied.

When the video format of the enhancement layer is not changed in comparison with the base layer, the start code for the header of the enhancement layer data which is defined as '0x05' in the second reserved area 452 is not necessary, and therefore is designated as a reserved area. That is, when the video formats of the base layer and the enhancement layer are identically 4:2:0, data for 4 luminance blocks and 2 chrominance blocks forming one macroblock are transmitted from the base layer. Meanwhile, when the video formats of the base layer and the enhancement layer are different from each other, for example, when the video format of the base layer is 4:2:0 and the video format of the enhancement layer is 4:2:2 or when the video format of the base layer is 4:2:0 and the video format of the enhancement layer is 4:4:4, data for 4 luminance blocks and 2 chrominance blocks are transmitted from the base layer, and at the same time, data for a chrominance residue block corresponding to the video format is transmitted from the enhancement layer so that the extended video format can be supported. Meanwhile, data for 4 luminance blocks are identical irrespective of the video formats, and the enhancement layer does not have to transmit separate data.

Meanwhile, information related to the enhancement layer is not restricted to the start codes described in FIG. 4, and can be included in a reserved area which is reserved for future use in a sequence level, a GOP level, a picture level, a macroblock level or a block level. Also, an enhancement layer identifier can be included in a variety of ways in a variety of layers of a network protocol or a system layer for loading and packaging a video bitstream as a payload in order to transmit the bitstream.

Next, a process of obtaining a scalable bitstream when a bit-depth among a plurality of coding parameters is extended will be explained with reference to FIG. 1.

In an example in which the first encoder 113 is an 8-bit encoder and the second encoder 117 is an N-bit encoder, the start code of the picture level of the enhancement layer bitstream in a scalable bitstream obtained from the second encoder 117 is used to express the remaining part of an extended bit-depth that cannot be expressed by the first encoder 113. For example, if it is assumed that the extended bit-depth is N bits and the extended quantization parameter in this case is $QP_N$, then the extended quantization parameter $QP_N$ can be expressed as equation 1 below by using the base quantization parameter $QP_8$ and the refined QP (R) for a case where a base bit-depth is 8 bits. Here, in the case of the VC-1 encoder, the extended quantization parameter $QP_N$ or the base quantization parameter $QP_8$ are derived from 'PQINDEX'.

$$QP_N = QP_8 \times 2^{(N-8)} + R \quad (1)$$

From equation 1, the refined QP (R) can be obtained by using equation 2 below.

$$R = QP_N - QP_8 \times 2^{(N-8)} \quad (2)$$

Here, the refined QP (R) is in the range of [−T, T−1] or [−T+1, T], and T is $2^{(N-8)}/2$. The range of the refined QP (R) is experimentally or statistically determined, or can be selectively determined as a frame unit, for example. For example, in an odd frame, the refined QP (R) is in the range of [−T, T−1] and in an even frame, the refined QP (R) is in the range of [−T+1, T], vice versa. Meanwhile, when $QP_N$ is a multiple of $2^{(N-8)}$, R is 0.

More specifically, when the second encoder 117 is a 10-bit encoder, a transform coefficient, for example, a discrete cosine transform (DCT) coefficient, is divided by the extended quantization parameter $QP_{10}$, thereby being quantized. The result of the quantization becomes an extended quantization level $Level_{10}$. In this case, according to equation 1, $QP_{10} = QP_8 \times 4 + R$. Meanwhile, the DCT coefficient which is restored in the second decoder 157 becomes '$Level_{10} \times QP_{10} = Level_{10} \times (QP_8 \times 4 + R)$'. When it is assumed that the range of $QP_{10}$ is $[2^{(N-8)}, 31 \times 2^{(N-8)}]$, the base quantization parameter $QP_8$ and the refined QP (R) according to each extended quantization parameter $QP_{10}$ is as follows.

$$QP_{10} = 4 \rightarrow QP_8 = 1, R = 0$$

$$QP_{10} = 5 \rightarrow QP_8 = 1, R = 1$$

$$QP_{10} = 6 \rightarrow QP_8 = 2, R = -2$$

$$QP_{10} = 7 \rightarrow QP_8 = 2, R = -1$$

$$QP_{10} = 124 \rightarrow QP_8 = 31, R = 0$$

According to one embodiment of the present invention, in response to the extended quantization parameter $QP_{10}$ which is set as a target, the second encoder 117 divides a DCT coefficient by the extended quantization parameter $QP_{10}$, thereby performing quantization. Then, the extended quantization level $Level_{10}$ that is a result of the quantization and the base quantization parameter $QP_8$ which is determined as described above, are included in the picture level of the base layer of a scalable bitstream and then, transmitted. The refined QP (R) is included in the picture level of the enhancement layer of the scalable bitstream and then, transmitted.

The first decoder 153 which receives this scalable bitstream obtains a restored DCT coefficient, i.e. '$QP_8 \times Level_{10}$' by using the extended quantization level $Level_{10}$ and the base quantization parameter $QP_8$ that are transmitted through the base layer. The second decoder 157 obtains a restored DCT coefficient, i.e. '$QP_8 \times Level_{10} \times 4 + Level_{10} \times R$' by using the $Level_{10}$ and the base quantization parameter $QP_8$ that are transmitted through the base layer, and the refined QP (R) that is transmitted through the enhancement layer.

More specifically, for example, if the DCT coefficient is '482' and the extended quantization parameter $QP_{10}$ is '13', the second encoder 117 generates a scalable bitstream in which '37' indicating the extended quantization level 'Level$_{10}$' and '3' indicating the base quantization parameter QP$_8$ are included in the base layer, and '1' which is the refined QP (R) is included in the enhancement layer, and transmits the scalable bitstream.

Meanwhile, the first decoder 153 receiving the scalable bitstream obtains '111' (=37×3) as the restored DCT coefficient, and the second decoder 157 obtains '481' (=444+37×1) as the restored DCT coefficient.

According to another embodiment of the present invention, in response to the extended quantization parameter QP$_{10}$ which is set as a target, the second encoder 117 divides a DCT coefficient by the extended quantization parameter QP$_{10}$, thereby performing quantization. Then, a modified base quantization level Level$_8$ that can be induced from the extended quantization level Level$_{10}$ that is a result of the quantization and the base quantization parameter QP$_8$ which is determined as described above, are included in the picture level of the base layer of a scalable bitstream and then, transmitted. The refined QP (R) is included in the picture level of the enhancement layer of the scalable bitstream and then, transmitted. The modified base quantization parameter QP$_8$ induced from the extended quantization level Level$_{10}$ is calculated according to the following process.

First, an extended quantization level Level$_N$ can be expressed according to equation 3 below, $$\text{Level}_N = DCT_{coeff}/QP_N \quad (3)$$

wherein, $DCT_{coeff}$ denotes a DCT coefficient.

The modified base quantization parameter QP$_8$ induced from the extended quantization level Level$_N$ can be calculated according to equation 4 below.

$$\text{Level}_8 = \text{Level}_N + \text{Round}(R \times \text{Level}_N/(QP_8 \times 2^{(N-8)})) \text{ or}$$

$$\text{Level}_8 = \text{Round}((QP_N \times \text{Level}_N)/(QP_8 \times 2^{(N-8)})) \quad (4)$$

The first decoder 153 which receives this scalable bitstream obtains a restored DCT coefficient, i.e. 'Level$_8$×QP$_8$' by using the modified base quantization level Level$_8$ and the base quantization parameter QP$_8$ that are transmitted through the base layer. The second decoder 157 calculates the extended quantization level Level$_N$ by using the modified base quantization level Level$_8$ and the base quantization parameter QP$_8$ that are transmitted through the base layer, and the refined QP (R) that is transmitted through the enhancement layer according to equation 5 below.

$$\text{Level}_N = \text{Floor}((\text{Level}_8 \times 2^{(N-8)} \times QP_8 + \text{Floor}(QP_N/2))/QP_N) \quad (5)$$

The DCT coefficient, Level$_N$×QP$_N$, of an N bit decoder can be calculated from the extended quantization level Level$_N$.

In more detail, in 10 bits codec, an encoder transforms an extended quantization level Level$_{10}$ to the modified base quantization level Level$_8$, transmits the modified base quantization level Level$_8$ and the base quantization parameter QP$_8$ through the base layer, and transmits the refined QP (R) through the enhancement layer. An 8 bit decoder obtains a restored DCT coefficient by Level$_8$×QP$_8$, a 10 bit decoder obtains Level$_{10}$ using QP$_8$, Level$_8$, and QP$_{10}$, multiplies the obtained Level$_{10}$ by QP$_{10}$, and obtains the restored DCT coefficient.

More specifically, for example, if the DCT coefficient is '482' and the extended quantization parameter QP$_{10}$ is '13', the second encoder 117 generates a scalable bitstream in which '40' indicating the modified base quantization level Level$_8$ and '3' indicating the base quantization parameter QP$_8$ are included in the base layer, and '1' which is the refined QP (R) is included in the enhancement layer, and transmits the scalable bitstream.

Meanwhile, the first decoder 153 receiving the scalable bitstream obtains '120' (=40×3) as the restored DCT coefficient. The second decoder 157 obtains '481' (=37×13) as the restored DCT coefficient using the restored extended quantization level Level$_{10}$ which is '37'.

According to another embodiment of the present invention, instead of the modified base quantization level, an encoder transmits a base quantization level Level$_8$ obtained by the base quantization parameter QP$_8$ and the base quantization parameter QP$_8$ through the base layer, and transmits the refined QP (R) through the enhancement layer. An 8 bit decoder obtains a restored DCT coefficient by Level$_8$×QP$_8$, a 10 bit decoder obtains Level$_{10}$ using QP$_8$, Level$_8$, and QP$_{10}$, multiplies the obtained Level$_{10}$ by QP$_{10}$, and obtains the restored DCT coefficient.

A process of obtaining a scalable bitstream when a video format among a plurality of coding parameters is extended will now be explained.

When video formats of the first encoder 113 and the second encoder 117 are different from each other, a concept of spatial scalability is applied, thereby generating a scalable bitstream. For example, when a base video format of the first encoder 113 is 4:2:0 and an extended video format of the second encoder 117 is 4:2:2, down-sampling by factor 2 in the vertical direction is performed on a chrominance block of a 4:2:2 original image, thereby restructuring the 4:2:2 image in a 4:2:0 video format before the block is input to the first encoder 113. The restructured 4:2:0 image is encoded in the first encoder 113, thereby forming a base layer bitstream. Meanwhile, before being input to the second encoder 117, up-sampling by factor 2 in the vertical direction is performed on a 4:2:0 restoration image, and a chrominance residue image between the 4:2:2 restoration image obtained as a result of the up-sampling and the 4:2:2 original image is obtained. The obtained chrominance residue image is encoded together with a coded block pattern (CBP) in the second encoder 117, thereby forming an enhancement layer bitstream.

Meanwhile, as another example, when a base video format of the first encoder 113 is 4:2:0 and an extended video format of the second encoder 117 is 4:4:4, down-sampling by factor 2 in the horizontal direction and in the vertical direction is performed on a chrominance block of a 4:4:4 original image, thereby restructuring the 4:4:4 image in a 4:2:0 video format before the block is input to the first encoder 113. The restructured 4:2:0 image is encoded in the first encoder 113, thereby forming a base layer bitstream. Meanwhile, before being input to the second encoder 117, up-sampling by factor 2 in the horizontal direction and in the vertical direction is performed on a 4:2:0 restoration image, and a chrominance residue image between the 4:4:4 restoration image obtained as a result of the up-sampling and the 4:4:4 original image is obtained. The obtained chrominance residue image is encoded together with a coded block pattern (CBP) in the second encoder 117, thereby forming an enhancement layer bitstream.

Here, the CBP, which is used in the first encoder 113 or the base layer encoding unit 510 illustrated in FIG. 5, of the second encoder 117 is formed by 6 bits in the case of a 4:2:0 video format, 8 bits in the case of a 4:2:2 video format, and 12 bits in the case of a 4:4:4 video format. Meanwhile, the CBP, which is used in the enhancement layer encoding unit 530 illustrated in FIG. 5, of the second encoder 117 is formed by 2 bits in the case of a 4:2:2 video format, and 4 bits in the case of a 4:4:4 video format, because an encoding process is performed only for a chrominance block.

FIG. 5 is a block diagram illustrating a structure of a video encoding apparatus according to an embodiment of the present invention. The video encoding apparatus according to the current embodiment is composed of a base layer encoding unit 510, an enhancement layer encoding unit 530, and a bitstream combining unit 550. The base layer encoding unit 510, the enhancement layer encoding unit 530, and the bitstream combining unit 550 can be implemented by using at least one processor (not shown).

Referring to FIG. 5, the base layer encoding unit 510 generates a base layer bitstream corresponding to a base bit-depth, by encoding video data. The base layer bitstream includes an extended quantization level and a base quantization parameter. Here, the extended quantization level is generated in a quantization process by an extended quantization parameter in an encoding process performed in the enhancement layer encoding unit 530. According to another embodiment of the present invention, instead of the extended quantization level, the modified base quantization level which is induced from the extended quantization level is included in the base layer bitstream. According to another embodiment of the present invention, instead of the extended quantization level, the base quantization level which is generated in a quantization process by a base quantization parameter in an encoding process performed in the base layer encoding unit 510 is included in the base layer bitstream.

The enhancement layer encoding unit 530 generates an enhancement layer bitstream supporting an extended bit-depth. The enhancement layer bitstream includes only the refined QP (R) as illustrated in FIG. 3B, and does not include an extended quantization level or a modified base quantization level.

The bitstream combining unit 550 generates a scalable bitstream having the syntax illustrated in FIG. 2 for example, by independently combining the base layer bitstream and the enhancement layer bitstream.

Figure 6:
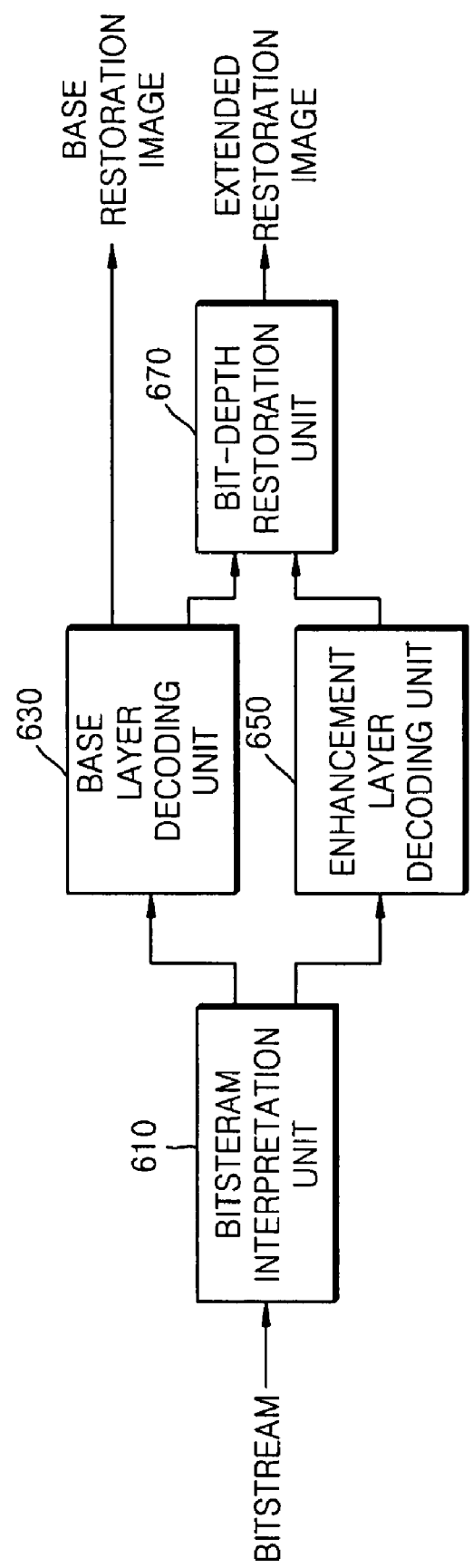
FIG. 6 is a block diagram illustrating a structure of a video decoding apparatus according to an embodiment of the present invention.

FIG. 6 is a block diagram illustrating a structure of a video decoding apparatus according to an embodiment of the present invention. The video decoding apparatus according to the current embodiment includes a bitstream interpretation unit 610, a base layer decoding unit 630, an enhancement layer decoding unit 650, and a bit-depth restoration unit 670. The bitstream interpretation unit 610, the base layer decoding unit 630, the enhancement layer decoding unit 650, and the bit-depth restoration unit 670 can be implemented by using at least one processor (not shown). According to another embodiment of the present invention, the video decoding apparatus may be formed by the bitstream interpretation unit 610 and the base layer decoding unit 630. The bitstream interpretation unit 610 and the base layer decoding unit 630 can be implemented by using a processor (not shown).

Referring to FIG. 6, the bitstream interpretation unit 610 interprets a received bitstream, thereby determining whether or not the bitstream includes an enhancement layer identifier.

If the received bitstream does not include an enhancement layer identifier, the base layer decoding unit 610 decodes the received bitstream, that is, a base layer bitstream, thereby generating a base restoration image corresponding to a base bit-depth. Meanwhile, if the received bitstream includes an enhancement layer identifier, the base layer decoding unit 630 decodes the base layer bitstream separated from the received bitstream, and provides an extended quantization level and a base quantization parameter obtained as a result of decoding, to the bit-depth restoration unit 670. According to another embodiment of the present invention, if the received bitstream includes an enhancement layer identifier, the base layer decoding unit 630 decodes the base layer bitstream separated from the received bitstream, and provides a modified base quantization level and a base quantization parameter obtained as a result of decoding, to the bit-depth restoration unit 670. According to another embodiment of the present invention, if the received bitstream includes an enhancement layer identifier, the base layer decoding unit 630 decodes the base layer bitstream separated from the received bitstream, and provides a base quantization level and a base quantization parameter obtained as a result of decoding, to the bit-depth restoration unit 670.

If the received bitstream includes an enhancement layer identifier, the enhancement layer decoding unit 650 decodes an enhancement layer bitstream separated from the received bitstream, and provides a refined QP (R) obtained from the header of the picture level of the enhancement layer as a result of decoding, to the bit-depth restoration unit 670.

The bit-depth restoration unit 670 obtains an extended quantization parameter by using the base quantization parameter provided by the base layer decoding unit 630 and the refined QP (R) provided by the enhancement layer decoding unit 650, and generates an extended restoration image corresponding to an extended bit-depth, by using the extended quantization parameter and the extended quantization level provided by the base layer decoding unit 630. According to another embodiment of the present invention, the bit-depth restoration unit 670 obtains an extended quantization parameter by using the base quantization parameter provided by the base layer decoding unit 630 and the refined QP (R) provided by the enhancement layer decoding unit 650, obtains an extended quantization level by using the extended quantization parameter and the modified base qunatization level provided by the base layer decoding unit 630, and generates an extended restoration image corresponding to an extended bit-depth, by using the extended quantization parameter and the extended quantization level. According to another embodiment of the present invention, the bit-depth restoration unit 670 obtains an extended quantization level by using the base quantization parameter and the base qunatization level provided by the base layer decoding unit 630, and the refined quantization parameter.

That is, the first decoder 153 of FIG. 1 receives a scalable bitstream and generates the base restoration image while ignoring the enhancement layer bitstream, and the second decoder 157 of FIG. 1 receives a scalable bitstream and generates the base restoration image and/or the extended restoration image, or receives an ordinary bitstream and generates a base restoration image.

Figure 7:
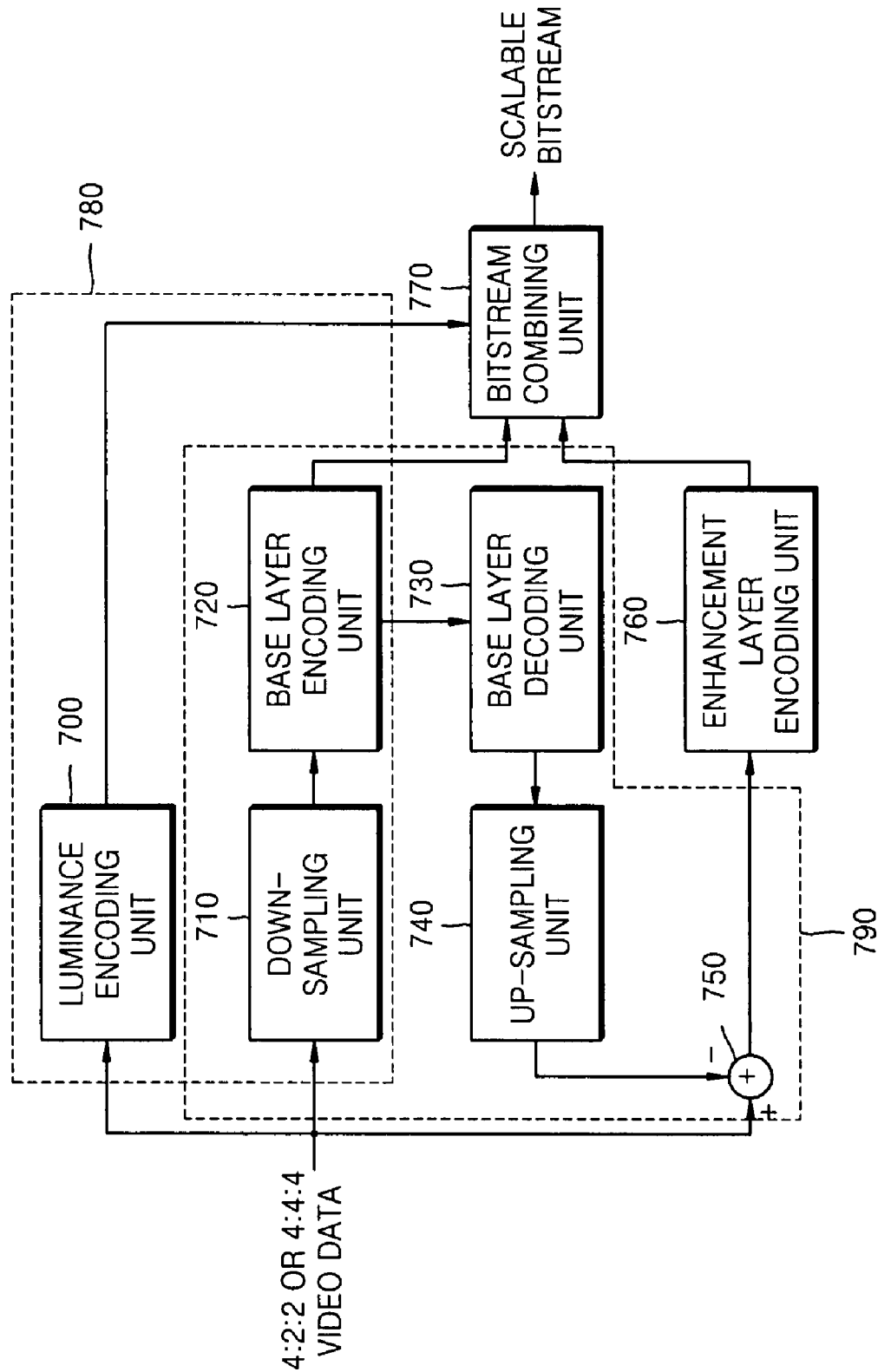
FIG. 7 is a block diagram illustrating a structure of a video encoding apparatus according to another embodiment of the present invention.

FIG. 7 is a block diagram illustrating a structure of a video encoding apparatus according to another embodiment of the present invention. The video encoding apparatus according to the current embodiment includes a luminance encoding unit 700, a down-sampling unit 710, a base layer encoding unit 720, a base layer decoding unit 730, an up-sampling unit 740, a subtraction unit 750, an enhancement layer encoding unit 760, and a bitstream combining unit 770. Here, the luminance encoding unit 700, the down-sampling unit 710, and the base layer encoding unit 720 form a base layer encoding module 780, and the luminance encoding unit 700, the chrominance residue image generation unit 790, and the enhancement layer encoding unit 760 form an enhancement layer encoding module. Meanwhile, a chrominance residue image generation unit 790 is composed of the down-sampling unit 710, the base layer encoding unit 720, the base layer decoding unit 730, the up-sampling unit 740, and a subtraction unit 750. The luminance encoding unit 700, the down-sampling unit 710, the base layer encoding unit 720, the base layer decoding unit 730, the up-sampling unit 740, the subtraction unit 750, the enhancement layer encoding unit 760, and the bitstream combining unit 770 can be implemented by using at least one processor (not shown).

Referring to FIG. 7, since video data has an identical luminance block irrespective of a video format, one luminance bitstream can be shared by a base video format and an extended video formate. Accordingly, the luminance encoding unit 700 encodes a luminance block of input video data, thereby generating a luminance bitstream.

When the video format of the input video data is 4:2:2, the down-sampling unit 710 performs down-sampling by factor 2 of a chrominance block in the vertical direction, thereby restructuring the block in a 4:2:0 video format. Also, when the video format of the input video data is 4:4:4, the down-sampling unit 710 performs down-sampling by factor 2 of a chrominance block in the horizontal direction and in the vertical direction, thereby restructuring the block in a 4:2:0 video format.

The base layer encoding unit 720 encodes the restructured chrominance block in the 4:2:0 video format, thereby generating a base layer chrominance bitstream. The base layer decoding unit 730 decodes the encoded chrominance block in the 4:2:0 video format.

When the video format of the input video data is 4:2:2, the up-sampling unit 730 performs up-sampling by factor 2 of the decoded chrominance block in the 4:2:0 video format in the vertical direction. Meanwhile, if the video format of the input video data is 4:4:4, the up-sampling unit 730 performs up-sampling by factor 2 of the decoded chrominance block in the 4:2:0 video format in the horizontal direction and in the vertical direction.

The subtraction unit 750 obtains a chrominance residue image between the restored chrominance block in the 4:2:2 video format obtained as a result of the up-sampling, and a chrominance block in the original image in the 4:2:2 video format. Also, the subtraction unit 750 obtains a chrominance residue image between the restored chrominance block in the 4:4:4 video format obtained as a result of the up-sampling, and a chrominance block in the original image in the 4:4:4 video format. The enhancement layer encoding unit 760 encodes the chrominance residue image, thereby generating an enhancement layer chrominance bitstream.

The bitstream combining unit 770 generates a base layer bitstream by combining the luminance bitstream and the base layer chrominance bitstream, generates the enhancement layer chrominance bitstream as an enhancement layer bitstream, and combines the base layer bitstream and the enhancement layer bitstream, thereby generating the scalable bitstream as illustrated in FIG. 2 for example.

Figure 8:
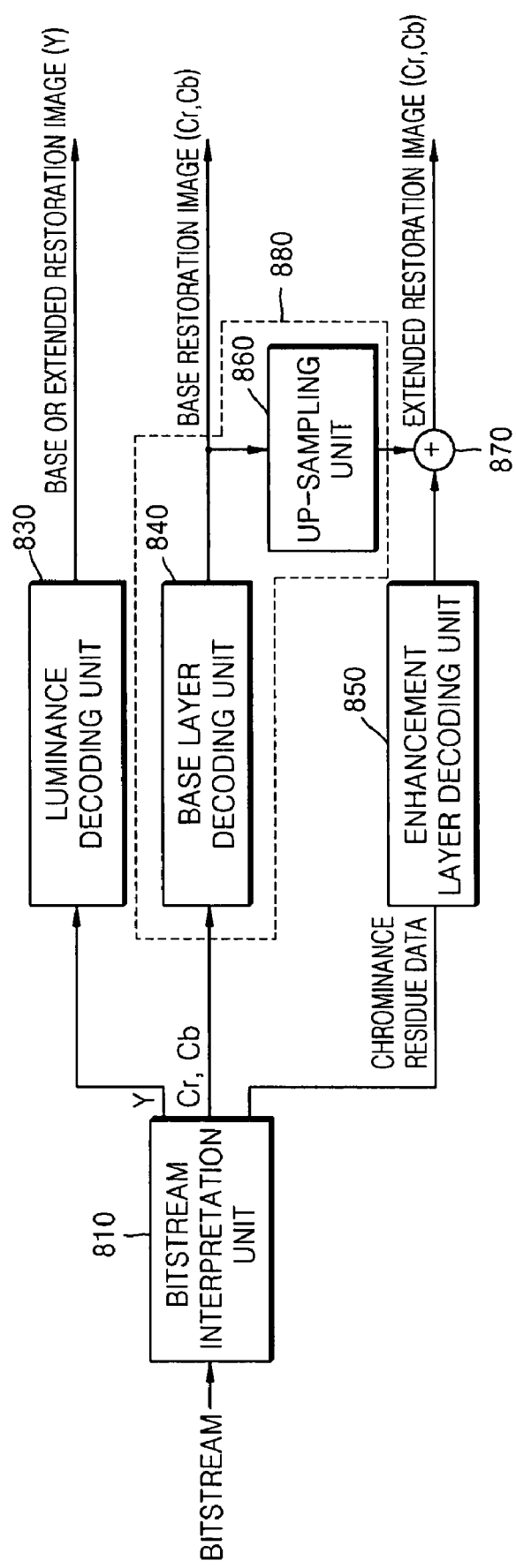
FIG. 8 is a block diagram illustrating a structure of a video decoding apparatus according to another embodiment of the present invention.

FIG. 8 is a block diagram illustrating a structure of a video decoding apparatus according to another embodiment of the present invention. The video decoding apparatus according to the current embodiment includes a bitstream interpretation unit 810, a luminance decoding unit 830, a base layer decoding unit 840, an enhancement layer decoding unit 850, an up-sampling unit 860, and an addition unit 870. Here, the base layer decoding unit 840 and the up-sampling unit 860 form an intermediate chrominance restoration image generation unit 880. The bitstream interpretation unit 810, the luminance decoding unit 830, the base layer decoding unit 840, the enhancement layer decoding unit 850, the up-sampling unit 860, and the addition unit 870 can be implemented by using at least one processor (not shown).

Referring to FIG. 8, the bitstream interpretation unit 810 interprets a received bitstream, thereby determining whether or not the bitstream includes an enhancement layer identifier.

Irrespective of whether or not the received bitstream includes an enhancement layer identifier, the luminance decoding unit 830 decodes a luminance bitstream in the received bitstream, thereby generating a luminance restoration image so that the luminance restoration image can be used when a base restoration image or an extended restoration image is generated.

If the received bitstream does not include an enhancement layer identifier, the base layer decoding unit 840 decodes a chrominance bitstream, that is, a base layer chrominance bitstream in the received bitstream, thereby generating a chrominance restoration image, that is, a base chrominance restoration image. Meanwhile, if the received bitstream includes an enhancement layer identifier, the base layer decoding unit 840 decodes a base layer chrominance bitstream in the received bitstream, generates a base chrominance restoration image, and provides the generated base chrominance restoration image to the up-sampling unit 860.

If the received bitstream includes an enhancement layer identifier, the enhancement layer decoding unit 850 decodes an enhancement layer chrominance bitstream in the received bitstream to restore a chrominance residue image, and provides the restored chrominance residue image to the addition unit 870.

The up-sampling unit 860 performs up-sampling of the base chrominance restoration image of the base layer provided by the base layer decoding unit 840 to generate an intermediate chrominance restoration image, and provides the intermediate chrominance restoration image to the addition unit 870. In this case, according to the extended video format used in the encoding process is performed, the up-sampling is performed only in the vertical direction or in both the horizontal and vertical direction.

The addition unit 870 adds the intermediate chrominance restoration image whose video format is adjusted in the up-sampling unit 860, and the chrominance residue image restored in the enhancement layer decoding unit 850, thereby generating an extended chrominance restoration image.

Although not shown, by using the luminance restoration image generated in the luminance decoding unit 830 and the base chrominance restoration image generated in the base layer decoding unit 840, a base restoration image is obtained. That is, the first decoder 153 of FIG. 1 receives a scalable bitstream and generates the base restoration image while ignoring the enhancement layer bitstream. Likewise, by using the luminance restoration image generated in the luminance decoding unit 830 and the extended chrominance restoration image generated in the addition unit 870, an extended restoration image is generated. That is, the second decoder 157 of FIG. 1 receives a scalable bitstream and generates the base restoration image and/or the extended restoration image, or receives an ordinary bitstream and generates a base restoration image.

Figure 9:
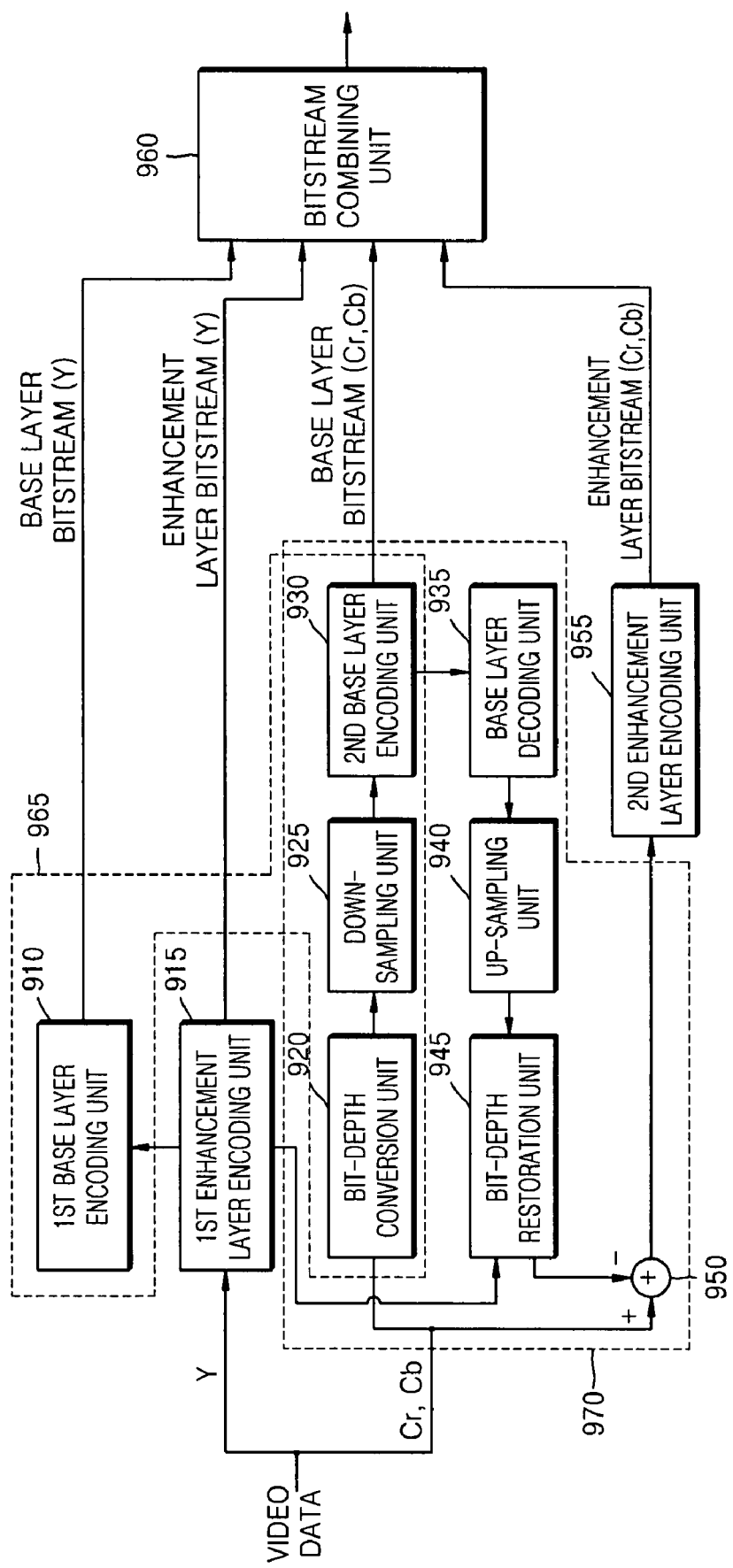
FIG. 9 is a block diagram illustrating a video encoding apparatus according to another embodiment of the present invention.

FIG. 9 is a block diagram illustrating a video encoding apparatus according to another embodiment of the present invention. The video encoding apparatus according to the current embodiment includes a first base layer encoding unit 910, a first enhancement layer encoding unit 915, a bit-depth conversion unit 920, a down-sampling unit 925, a second base layer encoding unit 930, a base layer decoding unit 935, an up-sampling unit 940, a bit-depth restoration unit 945, a subtraction unit 950, a second enhancement layer encoding unit 955, and a bitstream combining unit 960. The video encoding apparatus according to the current embodiment is obtained by combining the embodiment illustrated in FIG. 5 and the embodiment illustrated in FIG. 7. Here, the first base layer encoding unit 910, the bit-depth conversion unit 920, the down-sampling unit 925, and the second base layer encoding unit 930 form a base layer encoding module 965. Meanwhile, the first enhancement layer encoding unit 915, a chrominance residue image generation unit 970, and the second enhancement layer encoding unit 955 form an enhancement layer encoding module. Meanwhile, the chrominance residue image generation unit 970 is composed of the bit-depth conversion unit 920, the down-sampling unit 925, the second base layer encoding unit 930, the base layer decoding unit 935, the up-sampling unit 940, the bit-depth restoration unit 945, and the subtraction unit 950. The first base layer encoding unit 910, the first enhancement layer encoding unit 915, the bit-depth conversion unit 920, the down-sampling unit 925, the second base layer encoding unit 930, the base layer decoding unit 935, the up-sampling unit 940, the bit-depth restoration unit 945, the subtraction unit 950, the second enhancement layer encoding unit 955, and the bitstream combining unit 960 can be implemented by using at least one processor (not shown).

Referring to FIG. 9, the first base layer encoding unit 910 generates a base layer luminance bitstream supporting a base bit-depth. The base layer luminance bitstream includes the extended quantization level and the base quantization parameter as illustrated in FIG. 3C. Here, the extended quantization level is generated when quantization is performed in the encoding process performed by the first enhancement layer encoding unit 915.

The first enhancement layer encoding unit 915 encodes a luminance block of video data, thereby generating an enhancement layer luminance bitstream supporting an extended bit-depth. The enhancement layer luminance bitstream includes the refined QP (R) for refining the difference between a base bit-depth and an extended bit-depth, as illustrated in FIG. 3B and as the encoding result, the extended quantization level by the extended quantization parameter is provided to the first base layer encoding unit 910.

The bit-depth conversion unit 920 divides a chrominance block of the video data by $2^{n2-n1}$, thereby converting the bit-depth. Here, n2 indicates an extended bit-depth, and n1 indicates a base bit-depth.

The down-sampling unit 925 performs down-sampling of the chrominance block whose bit-depth is converted in the bit-depth conversion unit 920. In this case, according to a video format desired to be supported, down-sampling may be performed only in the vertical direction or in both the horizontal and vertical direction.

The second base layer encoding unit 930 encodes the chrominance block provided by the down-sampling unit 925, thereby generating a chrominance bitstream of the base layer supporting a first video format.

The base layer decoding unit 935 decodes the encoded chrominance block of the first video format. The up-sampling unit 940 performs up-sampling of the decoded chrominance block of the first video format. In this case, the up-sampling corresponding to the down-sampling unit 925 is performed, thereby obtaining the decoded chrominance block of a second or third video format. That is, according to the video format desired to be supported, up-sampling may be performed only in the vertical direction or in both the horizontal and vertical direction.

The bit-depth restoration unit 940 restores the bit-depth of the decoded chrominance block of the first video format provided by the up-sampling unit 945, by using the refined QP (R) obtained in the first enhancement layer encoding unit 915.

The subtraction unit 950 obtains a chrominance residue image between the restored chrominance block in the second or third video format provided by the bit-depth restoration unit 940, and a chrominance block in the input original image in the second or third video format. The second enhancement layer encoding unit 955 encodes the chrominance residue image, thereby generating the chrominance bitstream of the enhancement layer.

The bitstream combining unit 960 combines the luminance bitstream of the base layer and the chrominance bitstream of the base layer, thereby generating a base layer bitstream. The bitstream combining unit 960 combines the luminance bitstream of the enhancement layer and the chrominance bitstream of the enhancement layer, thereby generating an enhancement layer bitstream. Then, the bitstream combining unit 960 independently combines the base layer bitstream and the enhancement layer bitstream, thereby generating the scalable bitstream as illustrated in FIG. 2 for example.

Figure 10:
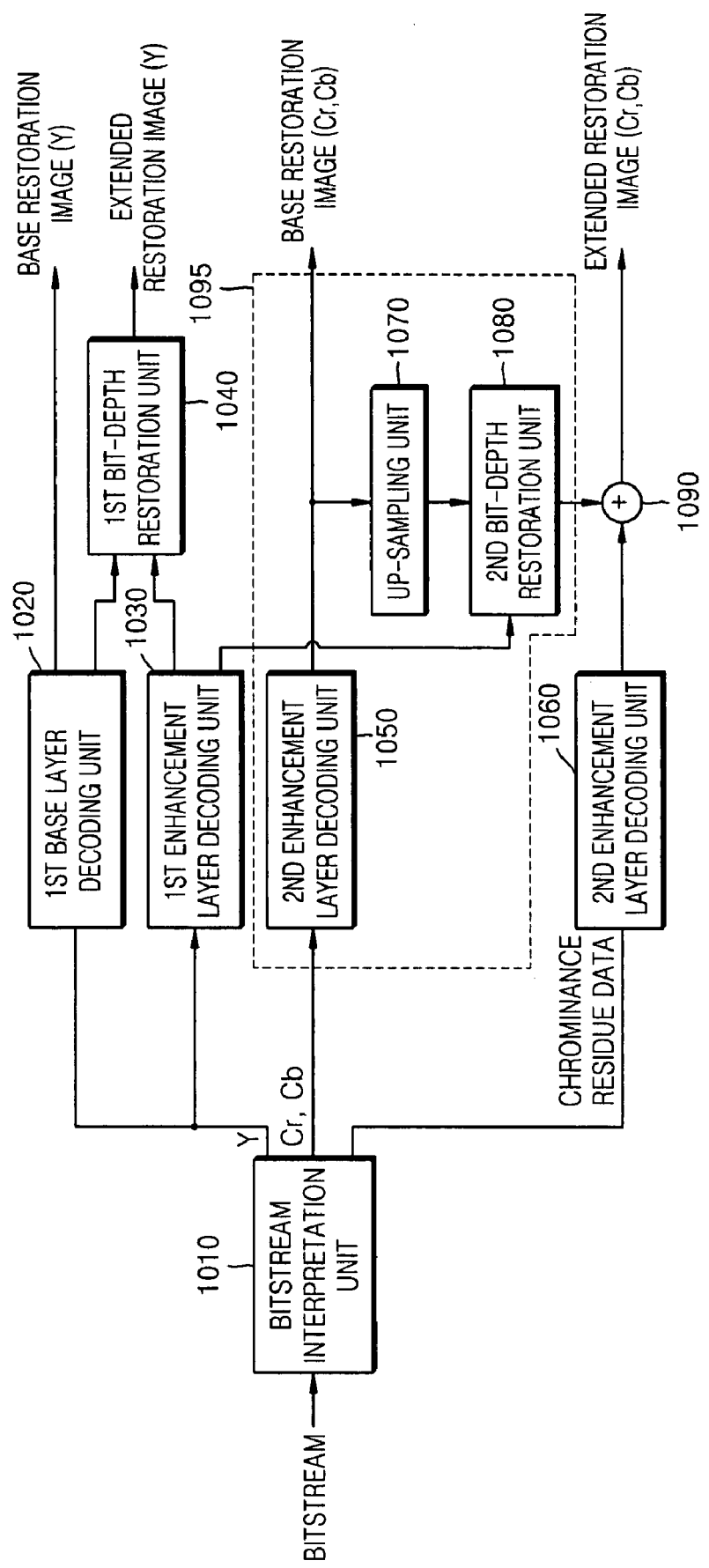
FIG. 10 is a block diagram illustrating a video decoding apparatus according to another embodiment of the present invention.

FIG. 10 is a block diagram illustrating a scalable decoding apparatus according to another embodiment of the present invention. The scalable decoding apparatus according to the current embodiment includes a bitstream interpretation unit 1010, a first base layer decoding unit 1020, a first enhancement layer decoding unit 1030, a first bit-depth restoration unit 1040, a second base layer decoding unit 1050, a second enhancement layer decoding unit 1060, an up-sampling unit 1070, a second bit-depth restoration unit 1080, and an addition unit 1090. Here, the second base layer decoding unit 1050, the up-sampling unit 1070, and the second bit-depth restoration unit 1080 form an intermediate chrominance restoration image generation unit 1095. The bitstream interpretation unit 1010, the first base layer decoding unit 1020, the first enhancement layer decoding unit 1030, the first bit-depth restoration unit 1040, the second base layer decoding unit 1050, the second enhancement layer decoding unit 1060, the up-sampling unit 1070, the second bit-depth restoration unit 1080, and the addition unit 1090 can be implemented by using at least one processor (not shown).

Referring to FIG. 10, the bitstream interpretation unit 1010 interprets a received bitstream, thereby determining whether or not the received bitstream includes an enhancement layer identifier.

If the bitstream does not include an enhancement layer identifier, the first base layer decoding unit 1020 decodes a luminance bitstream in the received bitstream, thereby generating a base luminance restoration image having a base bit-depth. Meanwhile, if the received bitstream includes an enhancement layer identifier, the first base layer decoding unit 1020 decodes the base layer luminance bitstream separated from the received bitstream, and provides an extended quantization level and a base quantization parameter obtained as a result of decoding, to the first bit-depth restoration unit 1040. According to another embodiment of the present invention, if the received bitstream includes an enhancement layer identifier, the first base layer decoding unit 1020 decodes the base layer luminance bitstream separated from the received bitstream, and provides a modified base quantization level and a base quantization parameter obtained as a result of decoding, to the first bit-depth restoration unit 1040.

If the received bitstream includes an enhancement layer identifier, the first enhancement layer decoding unit 1030 decodes a luminance bitstream of an enhancement layer in the received bitstream, and provides a refined QP (R) obtained as a result of the decoding, to the first bit-depth restoration unit 1040.

By using the extended quantization level and the base quantization parameter provided by the first base layer decoding unit 1020 and the refined QP (R) provided by the first enhancement layer decoding unit (1030), the first bit-depth restoration unit 1040 obtains an extended luminance restoration image corresponding to the extended bit-depth. According to another embodiment of the present invention, by using the modified base quantization level and the base quantization parameter provided by the first base layer decoding unit 1020 and the refined QP (R) provided by the first enhancement layer decoding unit (1030), the first bit-depth restoration unit 1040 obtains an extended luminance restoration image corresponding to the extended bit-depth.

If the received bitstream does not include an enhancement layer identifier, the second base layer decoding unit 1050 decodes a chrominance bitstream in the received bitstream, thereby generating a base chrominance restoration image. If the received bitstream includes an enhancement layer identifier, the second base layer decoding unit 1050 decodes an enhancement layer chrominance bitstream in the received bitstream, thereby generating a base chrominance restoration image.

If the received bitstream includes an enhancement layer identifier, the second enhancement layer decoding unit 1060 decodes an enhancement layer chrominance bitstream in the received bitstream to restore a chrominance residue image, and provides the restored chrominance residue image to the addition unit 1090.

The up-sampling unit 1070 performs up-sampling of the base chrominance restoration image provided by the second base layer decoding unit 1050, and provides the up-sampling result to the restoration unit 1080. In this case, according to the extended video format used in the encoding processing, the up-sampling is performed only in the vertical direction or in both the horizontal and vertical direction.

By using the refined QP (R) obtained in the first enhancement layer encoding unit 1030, the second bit-depth restoration unit 1080 restores the bit-depth of the decoded chrominance block of the second or third video format provided by the up-sampling unit 1070.

The addition unit 1090 adds the intermediate chrominance restoration image whose bit-depth and video format are adjusted in the second bit-depth restoration unit 1080, and the chrominance residue image decoded in the second enhancement layer decoding unit 1060, thereby generating an extended chrominance restoration image.

As in the previous embodiment of the scalable decoding apparatus, by using the base luminance restoration image generated in the first base layer decoding unit 1020, and the base chrominance restoration image generated in the second base layer decoding unit 1050, a base restoration image is obtained. That is, the first decoder 153 of FIG. 1 receives a scalable bitstream and generates the base restoration image while ignoring the enhancement layer bitstream. Also, by using the luminance restoration image generated in the first enhancement layer decoding unit 1030, and the extended chrominance restoration image generated in the addition unit 1090, an extended restoration image is generated. That is, the second decoder 157 of FIG. 1 receives a scalable bitstream and generates the base restoration image and/or the extended restoration image, or receives an ordinary bitstream and generates a base restoration image.

In the embodiments described above, each encoding unit and each decoding unit may be implemented by using a motion-compensated DCT encoder and decoder, but are not limited thereto.

In addition, in the embodiments described above, the supporting of two codecs in which at least one of a bit-depth and a video format is different is explained based on the example of the scalable bitstream formed by one base layer bitstream and one enhancement layer bitstream. However, the present invention can also support two or more codecs by using a plurality of enhancement layer bitstreams. Also, although the example of the bit-depth, in which the base bit-depth is smaller than the extended bit-depth, is explained in the above embodiments, the present invention can also be applied to a different conversion direction of the bit-depth, i.e., when the base bit-depth are greater than the extended bit-depth, in various ways of changing the design. Also, in the above embodiments, the refined QP (R) is allocated in the picture level, but when necessary, the refined QP (R) can be allocated in a slice level, a macroblock level, or a block level.

According to the present invention as described above, in order to provide a new video codec guaranteeing forward compatibility, a video encoder generates a scalable bitstream formed with a base layer bitstream and an enhancement layer bitstream. Then, a conventional base decoder which receives the scalable bitstream decodes the scalable bitstream, by using the base layer bitstream obtained from the scalable bitstream, and an improved decoder decodes the scalable bitstream, by using both the base layer bitstream and the enhancement layer bitstream. In this way, both the improved video codec and the conventional video code share the scalable bitstream in a harmonized way. More specifically, according to the present invention, a conventional Windows Media Video (WMV) codec or VC-1 codec can be used together with a new video codec supporting a new bit-depth and a new video format.

Thus, since the video codec according to the present invention provides the forward compatibility, the present invention can be applied to a variety of video codecs regardless of a supported bit-depth or video format, for example, to the conventional basic video codecs as well as improved video codecs mounted on a wired or wireless electronic device, such as a mobile phone, a DVD player, a portable music player, or a car stereo unit.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers of ordinary skill in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A video decoding method comprising:
   decoding a base layer bitstream including a quantization level of video data and a base quantization parameter corresponding to a base bit-depth in a received bitstream to obtain a base restoration image;
   decoding an enhancement layer bitstream including a refined quantization parameter for refining the difference between an extended bit-depth and the base bit-depth in the received bitstream; and
   obtaining an extended restoration image corresponding to an extended bit-depth by using the decoded quantization level, the decoded base quantization parameter, and the decoded refined quantization parameter.

2. The method of claim 1, wherein the quantization level is a modified base quantization level which is induced from an extended quantization level obtained by quantizing the video data using an extended quantization parameter corresponding to the extended bit-depth.

3. The method of claim 1, wherein the quantization level is a base quantization level obtained by quantizing the video data using a base quantization parameter corresponding to the base bit-depth, and the base quantization level, the base quantization parameter and the refined quantization parameter are used to obtain an extended quantization level.

4. The method of claim 1, wherein the quantization level is an extended quantization level obtained by quantizing the video data using an extended quantization parameter corresponding to the extended bit-depth.

5. The method of claim 1, wherein the base layer bitstream includes a luminance bitstream comprising the quantization level obtained by encoding a luminance block and the base quantization parameter, and a first chrominance bitstream obtained by encoding a chrominance block of a base video format, and the enhancement layer bitstream includes the refined quantization parameter and a second chrominance bitstream which is obtained by encoding a chrominance residue image between a restored chrominance block of an extended video format and an original chrominance block.

6. The method of claim 1, further comprising determining whether the scalable bitstream includes an enhancement layer identifier.

7. A video decoding apparatus comprising:
   a base layer decoding unit decoding a base layer bitstream including a quantization level of video data and a base quantization parameter corresponding to a base bit-depth in a received bitstream to obtain a base restoration image;
   an enhancement layer decoding unit decoding an enhancement layer bitstream including a refined quantization parameter for refining the difference between an extended bit-depth and the base bit-depth in the received bitstream; and
   a bit-depth restoration unit obtaining an extended restoration image corresponding to an extended bit-depth by using the decoded quantization level, the decoded base quantization parameter, and the decoded refined quantization parameter.

8. The apparatus of claim 7, wherein the quantization level is a modified base quantization level which is induced from an extended quantization level obtained by quantizing the video data using an extended quantization parameter corresponding to the extended bit-depth.

9. The method of claim 7, wherein the quantization level is a base quantization level obtained by quantizing the video data using a base quantization parameter corresponding to the base bit-depth, and the base quantization level, the base quantization parameter and the refined quantization parameter are used to obtain an extended quantization level.

10. The apparatus of claim 7, wherein the quantization level is an extended quantization level obtained by quantizing the video data using an extended quantization parameter corresponding to the extended bit-depth.

11. The apparatus of claim 7, wherein the base layer bitstream includes a luminance bitstream comprising the quantization level obtained by encoding a luminance block and the base quantization parameter, and a first chrominance bitstream obtained by encoding a chrominance block of a base video format, and the enhancement layer bitstream includes the refined quantization parameter and a second chrominance bitstream which is obtained by encoding a chrominance residue image between a restored chrominance block of an extended video format and an original chrominance block.

12. The apparatus of claim 7, further comprising a bitstream interpretation unit determining whether the scalable bitstream includes an enhancement layer identifier.

13. At least one computer readable device having embodied thereon a computer program for executing a video decoding method comprising:
   decoding a base layer bitstream including a quantization level of video data and a base quantization parameter corresponding to a base bit-depth in a received bitstream to obtain a base restoration image;
   decoding an enhancement layer bitstream including a refined quantization parameter for refining the difference between an extended bit-depth and the base bit-depth in the received bitstream; and
   obtaining an extended restoration image corresponding to an extended bit-depth by using the decoded quantization level, the decoded base quantization parameter, and the decoded refined quantization parameter.

* * * * *

UNITED STATES PATENT AND TRADEMARK OFFICE
CERTIFICATE OF CORRECTION

| | | |
|---|---|---|
| PATENT NO. | : 8,331,433 B2 | |
| APPLICATION NO. | : 11/896443 | |
| DATED | : December 11, 2012 | |
| INVENTOR(S) | : Dae-hee Kim et al. | |

It is certified that error appears in the above-identified patent and that said Letters Patent is hereby corrected as shown below:

In the Claims

In Col. 20, Line 15 Claim 9, delete "The method of claim 7," and insert
-- The apparatus of claim 7, --, therefor.

Signed and Sealed this
Fifteenth Day of October, 2013

Teresa Stanek Rea
*Deputy Director of the United States Patent and Trademark Office*